UNITED STATES PATENT OFFICE.

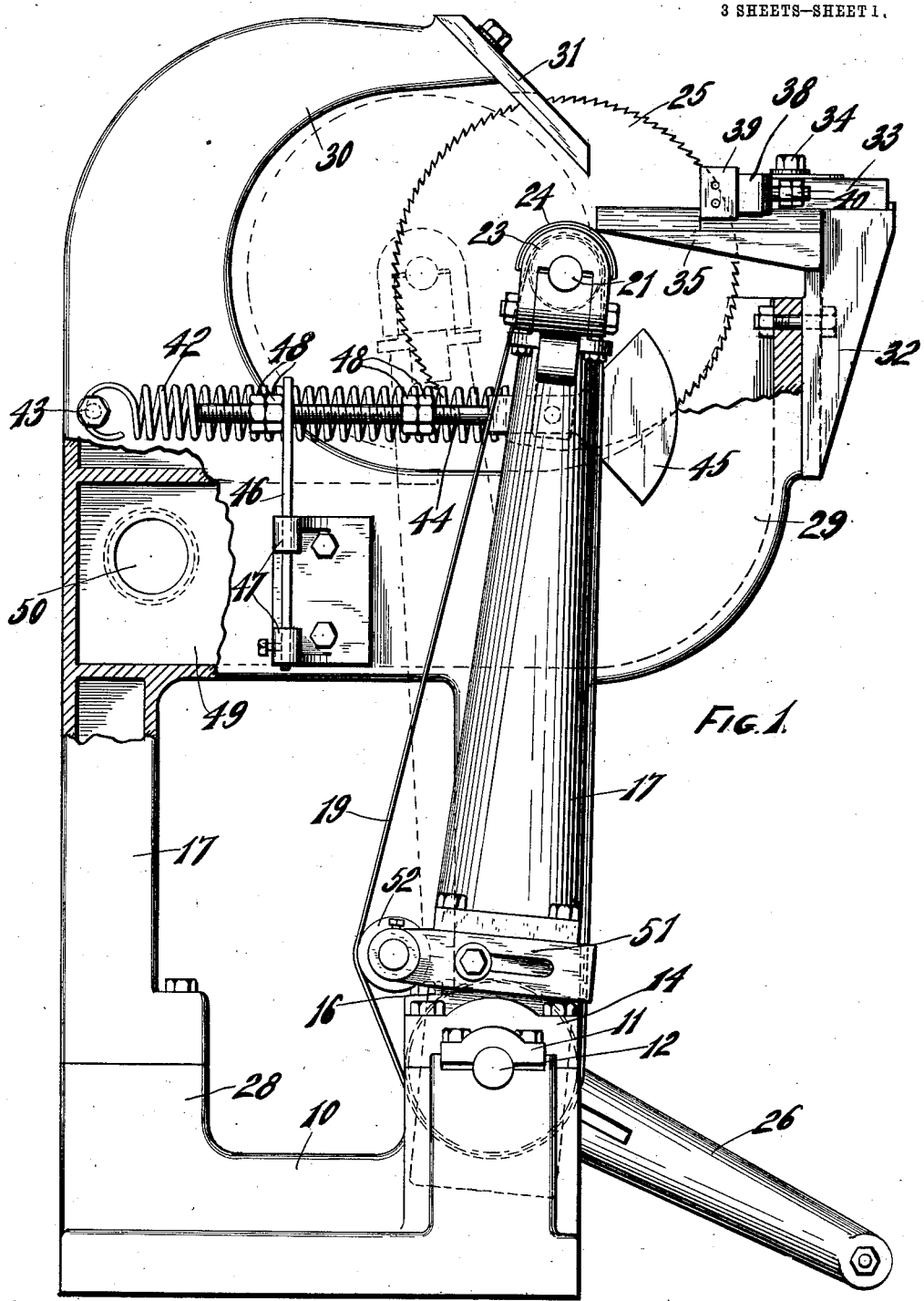

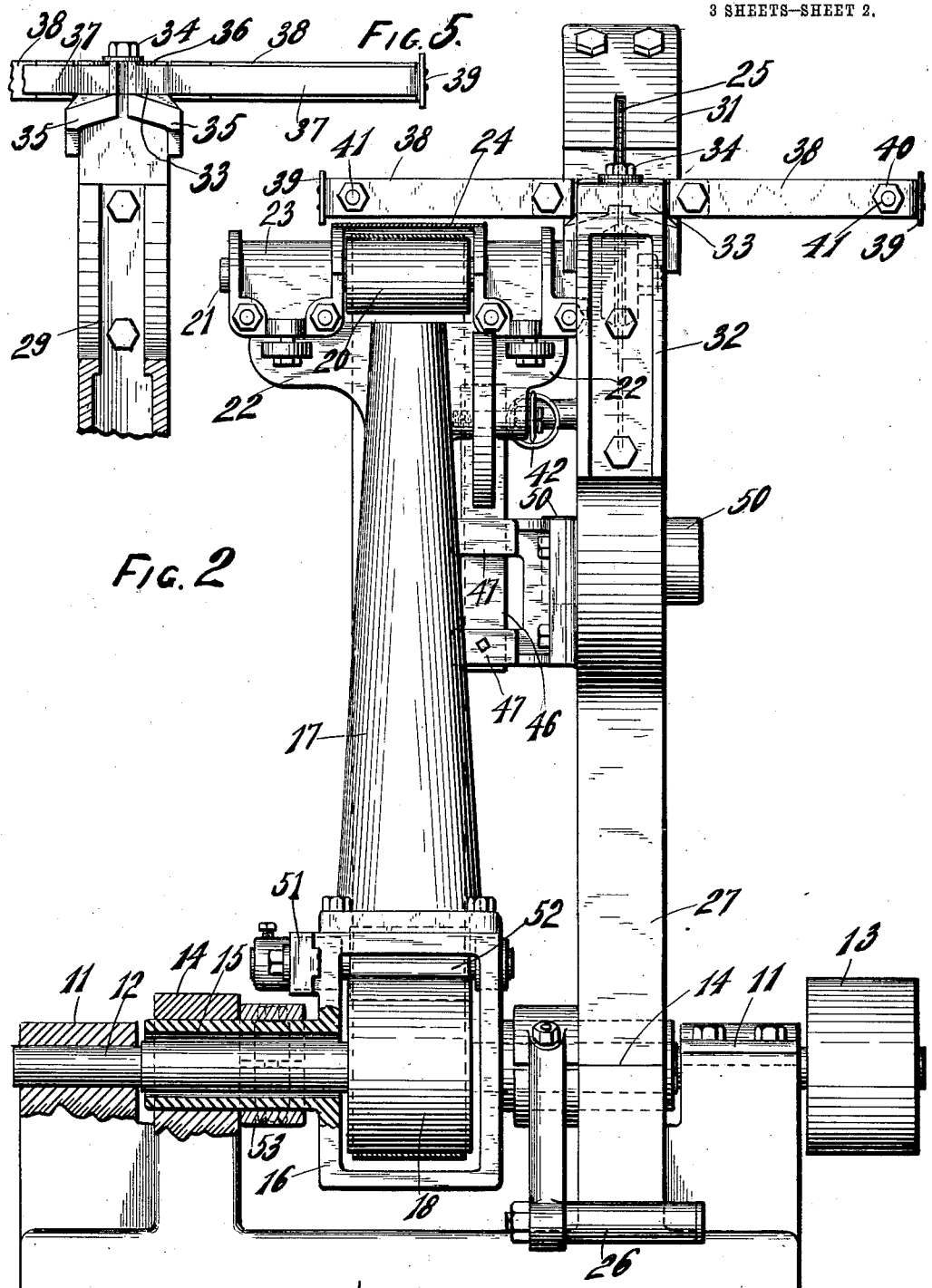

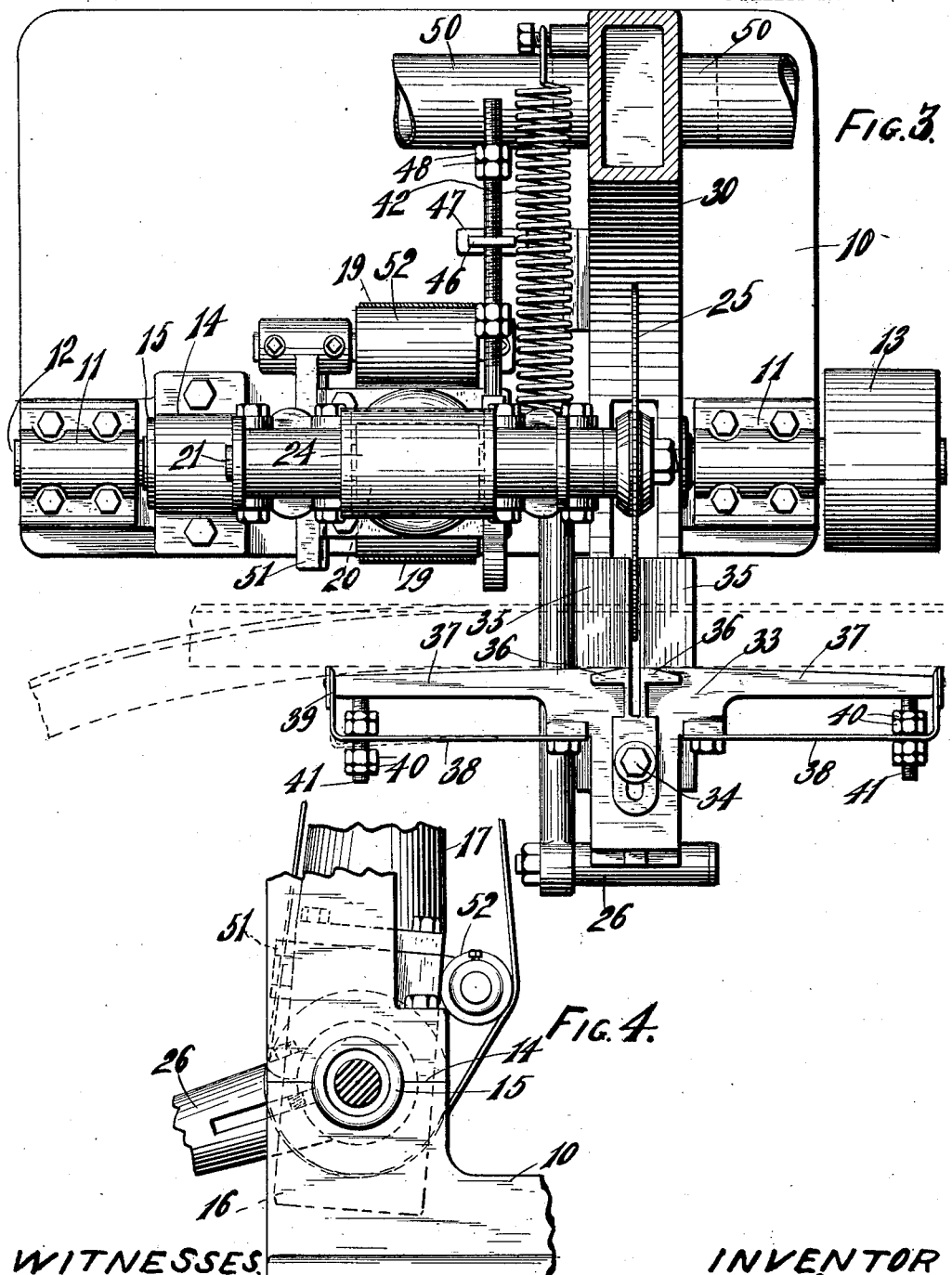

WILLIS S. SHERMAN, OF MILWAUKEE, WISCONSIN.

CUT-OFF SAW.

1,097,993.  Specification of Letters Patent.  Patented May 26, 1914.

Application filed March 23, 1912. Serial No. 685,798.

*To all whom it may concern:*

Be it known that I, WILLIS S. SHERMAN, a citizen of the United States, and resident of Milwaukee, in the county of Milwaukee and State of Wisconsin, have invented new and useful Improvements in Cut-Off Saws, of which the following is a description, reference being had to the accompanying drawings, which are a part of this specification.

This invention has for its object to provide a cut-off saw of novel construction whereby the work may be cut with square ends whether it be straight or crooked.

Another object of the invention is to provide a cut-off saw of simplified construction.

Referring to the accompanying drawings in which like characters of reference indicate the same parts in the different views: Figure 1 is a side elevation with parts in section of a cut-off saw constructed in accordance with this invention; Fig. 2 is a front elevation thereof; Fig. 3 is a plan view thereof; Fig. 4 is a detail view of the bearing for the saw frame formed between the frame and the base; Fig. 5 is a rear view of the work guide.

In these drawings 10 indicates a base forming bearings 11 at its ends in which is journaled a shaft 12 carrying a driving pulley 13. The base also forms bearings 14 for a sleeve 15 surrounding the shaft and has an enlarged central portion 16 on which is mounted the saw frame 17. The shaft 12 carries a pulley 18 within the central enlarged portion 16 of the sleeve and this pulley is connected by a belt 19 with a pulley 20 on a saw arbor 21 which is journaled across the upper end of the saw frame. The saw frame may merely consist of a hollow tapering arm with oppositely extending ribs 22 at its upper end forming the lower parts of bearings for the saw arbor and having inverted U-shaped caps 23 fitting on them to complete the bearings for the saw arbor. A sheet metal guard 24 connects the two bearings of the saw arbor and bridges over the belt pulley 20 to protect the belt and prevent the work falling thereon. A circular saw 25 is secured to the saw arbor and a treadle 26 adjustably clamped on the sleeve 15 constitutes the means for swinging the saw frame. One of the bearings 14 for the saw frame sleeve instead of having an ordinary cap to complete it has one leg of a frame 27 fitting thereon as a cap, the only other leg in the frame directly in the rear being supported on a block 28 rising from the base. The frame 27 is preferably hollow and forms a slotted support 29 in front for the work guide and a curved forwardly extending horn 30 forms a saw guard and the saw 25 travels between these two portions of the frame in the oscillating movements of the saw frame 17. The saw guard 30 has a slotted plate 31 secured to it and when the saw moves forward it passes through the slot of said plate.

Secured to the front face of the support 29 is a bracket 32 on which is fitted a work support 33 which is clamped in its adjusted positions by a bolt 34. This work support 33 has a pair of inclined guide plates 35 arranged side by side with a slot between them to receive the saw and each slopes away from the other and together they form a rest on which the work bears while being cut. The work support 33 also has a pair of upstanding beveled shoulders 36 against which the work is held by the operator before swinging the saw and which serve to take the pressure of the saw against the work. The work support 33 is furthermore provided with a pair of oppositely extending arms 37 which gradually recede toward their outer ends from the straight line of feed of the work to the saw. Spring work guides 38 are secured to the work support 33 and extend approximately parallel with the arms 37 and terminate in the line of travel of the work. The bent ends of the spring work guides 38 which are engaged by the work fed to the saw are provided with hard metal wearing plates 39 and the position of the engaging edges thereof is determined by the adjustment of jam nuts 40 on screw studs 41 which are mounted on the ends of arms and pass through openings in the spring work guides 38. These jam nuts are on opposite sides of the spring work guide 38 so that the work guide may be rigidly held in its adjusted position by tightening the nuts against opposite sides thereof as shown at the right of Fig. 3, or the outer set of nuts may be backed away from the spring guide as shown at the left of Fig. 3 to permit the guide to yield against the pressure of a crooked strip of work when the work is drawn by the operator against the shoulders 36 and the other guide 38. This assures the cutting of the work at approximately right angles to the first foot of length thereof so that in the case of flooring a proper fit will result between ends of adjacent strips when straightened in place even though the strips are crooked when cut to length.

As shown the machine is set for feeding the strips from the right, but by tightening the jam nuts of the spring guide on the left of the machine and backing the outer jam nuts from the spring guide at the right of the machine it may be adapted for feeding the work from the left. Besides adapting the machine for use with either right or left hand feed the presence of both spring guides 38 enables the operator to trim the last end of the work by bringing it into engagement with the shoulders 36 and the yielding spring guide without forcing said spring guide to move from its normal position.

While the saw frame 17 is drawn forward by pressing on the treadle 26, its return movement is accomplished by means of a coil spring 42 connecting it with a post 43 at the rear of the frame. The movements of the saw frame may be limited by pivotally mounting in a slot of one of the ribs 22 a screw rod 44 which is counterbalanced by a weight 45 on its front end and at its rear end passes through an opening in a leaf spring 46 mounted on a bracket 47 on the side of the frame. Jam nuts 48 on the screw rod engage the spring 46. By changing the adjustment of the jam nuts 48 the saw frame may be made to swing through the desired arc of movement and the limitation to the movement in each direction is cushioned by the yielding spring 46. The counterweight on the screw rod prevents the rod bearing its weight on the opening of the spring 46 and consequently avoids a rasping action thereof.

The hollow frame 17 affords a sawdust passageway 49 extending from the slot thereof through which the saw passes in completing its cut and terminating in a hollow boss or pipe connection 50 on the side of the frame which may have a connection with a suction means for withdrawing the sawdust or the saw blade acting as a blower may be relied upon for ejecting the sawdust through the passageway.

The saw belt 19 may be provided with any desired form of tightener, but it is preferred to provide a slide 51 on the side of the enlargement 16 of the sleeve which slide is adjustable and is provided with a roller 52 for the purpose.

In operation the work is drawn from a feed table and while having its rear end resting thereon is placed with its front end on the guide plates 35 with its edge drawn against the shoulders 36 and the spring guide 38. The treadle is then pressed and the saw blade appears through the slot between the work supporting plates 35 and the slot of the guard plate 31 and makes the cut at approximately right angles to that portion of the work which engages the shoulder 36 and the stationary guide 38. The end of the work which is cut off falls to the floor making it unnecessary for the operator to give attention thereto and the work is advanced for the next cut. In trimming the last end of the work it is brought against the yielding spring guide 38 and care is taken not to force said guide out of its normal position which will assure the last end of the work being cut square. When the saw has receded from the work it is practically impossible for the operator to accidentally come in contact therewith, for it is effectively guarded by the guide plates 35 and the guard 31 which come close together for the purpose. In working with narrow strips the work support 33 is adjusted closer to the saw to make the stroke of the saw frame as short as possible and the adjustment of the set nuts 48 is changed accordingly.

By mounting the shaft 12 and the saw frame sleeve in the manner shown, with the frame constituting the cap of one bearing for the sleeve, an economical and efficient construction is provided and the lateral play of the saw frame is prevented by the collar of treadle 26 engaging one bearing 14 and a set collar 53 engaging the other bearing 14.

The frame structure in a single casting is reduced to a most simple form and affords ample protection for the saw as well as providing it with a passageway for conducting the sawdust away.

It is obvious that should it be desired both of the spring guides may have their jam nuts adjusted to permit of their yielding, but it is preferred to have one guide fixed in its position.

What I claim as new and desire to secure by Letters Patent is:

1. In a cut-off saw, a work guide comprising a work support, a shoulder thereon against which the work may bear during the cutting operation, a fixed guide on one side of the shoulder, and a yielding guide on the other side of the shoulder.

2. In a cut-off saw, a work guide comprising a work support provided with a pair of shoulders adapted to receive the saw between them, arms on the work support extending from the shoulders in opposite directions, and adjustable spring guides on the arms adapted to have the work bear thereagainst, one of the arms being fixed in its position and the other being adapted to yield when the work bears thereon with pressure.

3. In a cut-off saw, a work guide comprising a work support provided with a pair of shoulders spaced to receive the saw between them, arms extending from the shoulders in opposite directions, springs secured to the work support and passing around the ends of the arms with their ends in alinement with the shoulders in the line of travel of the work, screw studs on the arms passing through openings of the springs, and set nuts on the studs for adjusting the positions of the ends of the springs, one of the springs being permitted to yield under the pressure of work upon it to accommodate crooked work.

In testimony whereof, I affix my signature, in presence of two witnesses.

WILLIS S. SHERMAN.

Witnesses:
 R. S. C. CALDWELL,
 KATHERINE HOLT.

Copies of this patent may be obtained for five cents each, by addressing the "Commissioner of Patents, Washington, D. C."